Patented Dec. 10, 1935

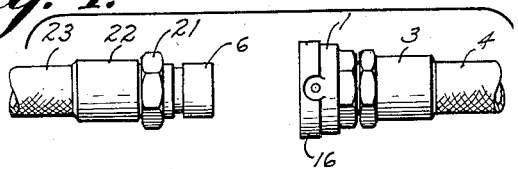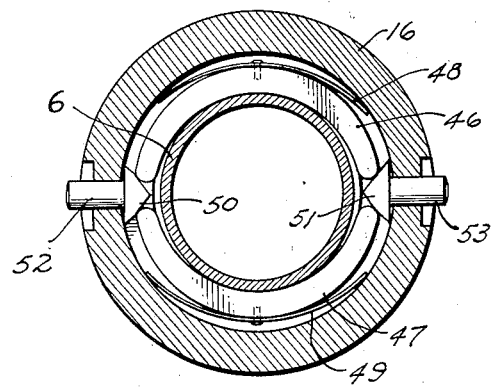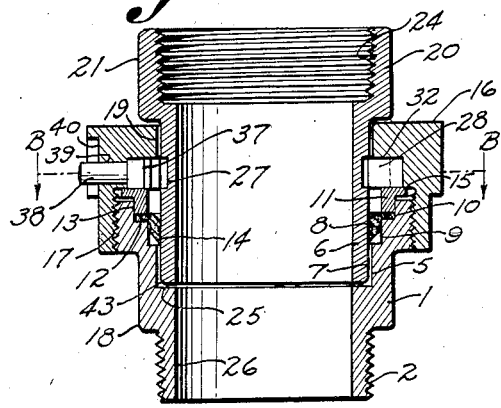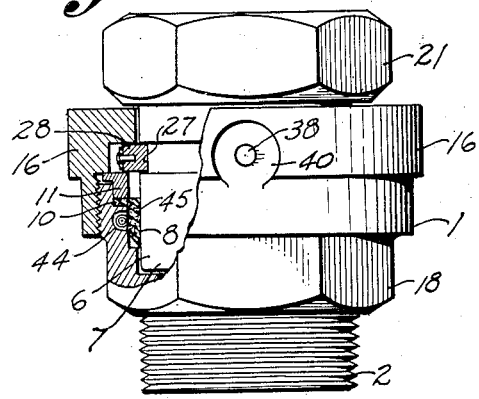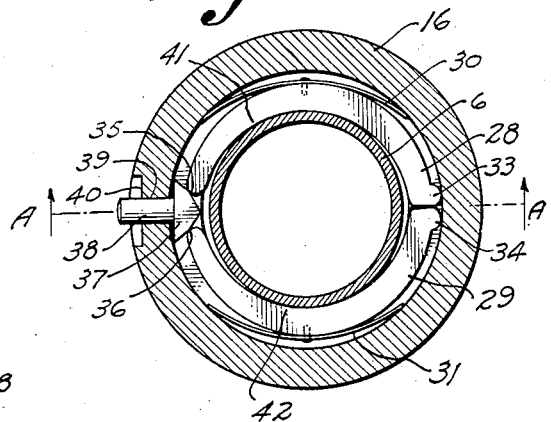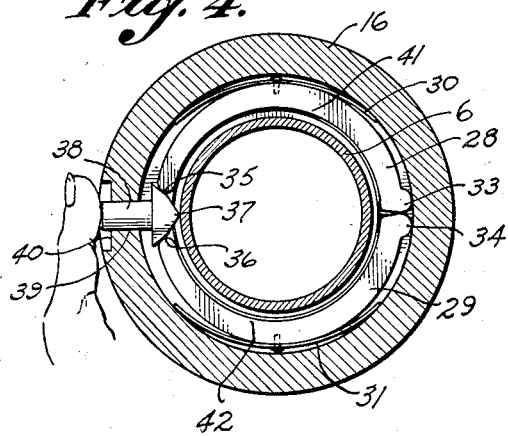

2,023,428

UNITED STATES PATENT OFFICE 2,023,428

COUPLING

Frederick C. Liebhardt, San Marino, Calif.

Application July 6, 1934, Serial No. 734,012

3 Claims. (Cl. 285—173)

My invention relates to improvements in couplings more particularly employed in coupling together two sections of hose.

An object of my invention is to provide a coupling in which the two halves can be easily and quickly united by simply pushing one half into the other, and which cannot be separated by pressure or pulling but only by a deliberate operation of a convenient releasing means.

Another object is to make a coupling which permits complete swiveling of one half within the other.

Another object is to make a coupling which is free from leakage regardless of the fluid pressure within, and in which the seal against leakage is tighter with increased pressure.

A further object of my invention is to provide a coupling having a smooth inside bore that offers no obstruction to the passage of fluid therethrough.

Another object of the invention is to make a coupling in which the male half which, when out of connection is exposed to dirt, wear, etc., is made in such a way that it is not easily damaged and can easily be cleaned.

Still another object is to provide a coupling which is dependable, of long life, and which is cheap to manufacture.

The manner of attainment of these and other objects which will appear from study of the further disclosure can best be explained in connection with the drawing of which:

Fig. 1 is a view showing the two halves of the coupling separated, each joined to a section of hose, and in position for uniting.

Fig. 2 is a sectional view of the united coupling taken in the diametric plane AA of Fig. 3.

Fig. 3 is a sectional view of the united coupling taken in a plane BB of Fig. 2 perpendicular to the axis of the coupling, with the locking mechanism in the locked position.

Fig. 4 is a sectional view similar to Fig. 3 except that the locking device is shown held in the unlocked or releasing position.

Fig. 5 is a sectional view taken in the same plane as in Fig. 3 but showing an alternative form of locking mechanism.

Fig. 6 is a view partly in diametric section of the united coupling showing an alternative form of sealing means.

In my coupling I provide a female member having a tubular body 1 with a hexagonal exterior 18 and with threads 2 at one end to receive a threaded female member 3 to which is attached one section 4 of the hose to be coupled. The body 1 is recessed at 5 to accommodate the male member 6 of the coupling. Clearance is left between the inside of the recess 5 and the outside surface 7 of member 6 to assure that surface 7 comes in sealing contact with a packing ring 8 which is set in another recess 9 of body 1. Packing 8 is formed with an annular flange 10 which is clamped by ring 11 against shoulder 12 formed as the bottom of another recess 13 into which the ring 11 fits. The packing ring 8 is preferably formed of leather but may be of any other suitable packing material such as rubber or composition, etc. It is preferably formed with a sharp beveled edge 14 at the end of its tubular section in such a manner that the inner surface of the ring 8 makes contact with member 6 even down to the sharp edge, but fluid under pressure from within the coupling can get back of the beveled portion 14 and force the sharp beveled edge more tightly against the surface 7 of ring 6 making a seal that increases in tightness as pressure increases.

An alternative seal is shown in Fig. 6. In this arrangement the packing ring 8 is formed in the same manner as that described in connection with Fig. 2 and is held in place by the same ring 11. But an annular recess 44 is formed in body 1 back of the packing ring 8. Into this recess is placed a resilient member such as a spiral spring 45 formed in a circle in such a way that the spring bears upon the packing ring to force it against the surface 7 to form a tight seal even when no fluid pressure exists in the coupling.

The ring 11 has an annular flange 15 which is engaged by a shoulder of the cap 16. Cap 16 is threaded at one end and is adapted to screw over the upper threaded portion 17 of body 1. The ring 11 is so proportioned that when cap 16 is screwed down tightly against flange 15, and flange 10 of the packing is tightly squeezed, there is left a clearance space between the bottom of flange 15 and the upper end of body 1. This permits any slack which might develop in the packing to be taken up and also makes it possible to more tightly press the packing against surface 7 by tightening down on cap 16. The cap 16 has a hole in the top permitting the member 6 to pass therethrough, the cap 16 being thick enough and the hole being of suitable diameter to cause the inner surface 19 to act as a guide for the insertion of member 6.

The male member 6 is a tubular nipple having cylindrical internal and external surfaces, and having an enlarged portion 20 with a hexagonally formed exterior 21 and threaded inside 24 to receive a male member 22 attached to the section 23 of the hose to be coupled. The member 6 is adapted to be inserted through the hole in cap 16 and into member 1 and be stopped by shoulder 25. The inside surface of member 6 is preferably of the same diameter as the surface 26 of member 1 and is adapted to form with this surface, when the coupling is united, a continuous smooth passage from one end of the coupling to the other. This is a feature of great importance in applications such as the coupling of fire hose where high fluid velocity exists and where no pressure loss due to frictional obstruction can be tolerated.

In the external surface 7 of member 6 is formed an annular groove 27 into which radially movable ring sections held in the female member spring when member 6 is inserted in operative position and prevent member 6 from being withdrawn unless the ring sections are deliberately released. The ring sections 28 and 29 which cooperate with groove 27 are preferably half rings having an inside diameter substantially the same as that of hole 19, but having at one end a fraction cut off so as to permit spreading of the ring sections by a cam as in Fig. 4, and to permit the ring sections, when the cam is not inserted, to contract sufficiently to allow the middle portions of these sections to seat on the bottom of the groove 27. The ring sections have attached to them on their outside surfaces flat springs 30 and 31 which, when in the extended condition of Fig. 4, encircle about half the ring sections. The ends of these springs bear on the inside wall of cap 16 and tend to push together, or contract, the ring sections radially. The ring sections are held by friction, due to spring pressure, within cap 16 and when cap 16 is in place on body 1, the ring sections are confined in an annular groove formed by the recess 32 in cap 16 and the top of flange 15. And when the cap 16 is screwed tightly against flange 15 the height of this groove is sufficient to permit free radial movement of the ring sections within it. The ring sections are formed with knobs 33 and 34 on one pair of contiguous ends and with cam surfaces 35 and 36 on the other ends. The cam surfaces are adapted to be engaged by a radially moving cam 37. This cam 37 is flat on top and bottom, of substantially the same thickness as ring sections 28 and 29, and is wedge-shaped on the sides, so that its intrusion into the separation between the ring sections spreads them apart, by reason of the action of the surfaces of the cam against the cam surfaces 35 and 36. In their preferred shapes the surfaces of the cam meet in a fairly sharp edge and recede at an included angle of about 60 degrees with the radius for more than half the distance and then break sharply to an angle of about 45 degrees with the radius for the remainder of the cam. In separating, the ring sections rock about the points of contact of knobs 33 and 34 with cap 16 so as to move substantially radially at the middles of the rings. The cam 37 has a cylindrical extension 38 which slides in a hole 39 through the wall of cap 16. The end of extension 38 is adapted to be engaged by a finger of the operator and depressed to permit disconnection of the coupling. To accommodate the finger a recess 40 is formed in the outside of the wall of cap 16 and surrounding the extension 38. The ring sections 28 and 29 are rounded on their upper inside edges at 41 and 42 and the lower outside corner 43 of member 6 is rounded to permit the easy introduction of member 6 into the ring sections.

In operation, the action is as follows: Assume that the coupling is disconnected. The ring sections 28 and 29 are, by reason of spring pressure, held together at both ends forming an oval shaped aperture. The member 6 is simply pushed into this aperture spreading the rings and keeping them spread until the male member is in operative position within the female member and groove 27 comes opposite the ring sections when they contract, by reason of spring pressure, into this groove, locking the coupling together. Ordinarily this operation is performed so rapidly, and the permissible movement of the ring sections is enough, that the member 6 comes to a stop against the shoulder 25 of body 1, making it unnecessary for the ring sections to take the shock of this impact. The two halves of the coupling are now united and they can only be disconnected by deliberately spreading the ring sections to a larger inside diameter than the diameter of surface 7. Fluid under pressure in the coupling is sealed against leakage by the packing 8 against surface 7; and the greater the pressure, the tighter the seal. Fluid cannot escape back of the packing 8 because of the tight compression of the packing by ring 11. It is important to note that the sealing means is effective not only in one position of the male member within the female member, but is effective in tightly sealing the coupling throughout the range of relative position of these members which is permitted by the imperfect fitting of the locking means. If this were not so, any slight movement of one member relative to the other would result in leakage. When it is desired to disconnect the coupling, the extension pin 38 is depressed by the finger of the operator, spreading the ring sections apart until their inside diameter is greater than the diameter of surface 7 when the two halves of the coupling can be separated easily and without effort.

An alternative locking and releasing means is shown in Fig. 5. In this arrangement, two ring sections 46 and 47 are adapted, as in the previously described locking means, to form, when contracted, an oval in which the middle portions of the ring sections can seat on the bottom of the groove 27, but which, when expanded, form a circle of diameter greater than the surface 7, permitting withdrawal of member 6. The two ring sections are under compression of flat springs 48 and 49 tending to contract them. Both the ring sections have cam surfaces formed on both ends adapted to be engaged by cams 50 and 51. These cams are operated by depressing with the finger extensions 52 and 53 passing through the wall of cap 16. The cams 50 and 51 have the same shape as the cam 37, previously described. In operation, the action of this locking means in preventing the separation of the two halves of the coupling is the same as that previously described; but in releasing the lock, both extensions 52 and 53 are depressed with the fingers until the ring sections have expanded sufficiently to permit easy withdrawal of member 6.

Needless to say, the ring sections of the locking means need not be two in number. There may be any convenient number of ring sections of any convenient length, either operated independently or through a unified control to move them radially into or out of engagement with the groove of the male member.

It will be observed that in addition to the advantages of a completely swivelling, pressure tight coupling that is easily connected, automatically locked, and conveniently released, I have also provided a device that is simple and cheap to construct and one that does not readily get out of order. A particularly valuable feature is that the male member of the coupling has on it no movable or delicate part which can by exposure become damaged. Neither member has on its exterior any protruding lever or key, etc., which might be broken or bent in handling the coupling. The seal is made on the straight cylindrical portion of the male member, which is easily kept free from dirt and dents which might cause leaks. These features combine in making my coupling a very practical one.

While I have disclosed the invention here in its preferred form, it is understood that many modifications in construction may be made by those skilled in the art without departing from the spirit and scope of the invention; and I, therefore, wish to be limited only by the appended claims.

What I claim as new and desire to secure by Letters Patent is:

1. A coupling comprising a male member and a female member adapted to form when united a fluid passage through said coupling, a stop limiting travel of said male member into said female member, a cylindrical outside surface on a portion of said male member, sealing means in said female member adapted to bear upon said cylindrical outside surface, an annular groove in said male member, a pair of ring sections radially movable in said female member, springs tending to contract said ring sections, said ring sections being adapted to spring into said groove when said male member is inserted into said female member, cam surfaces on a pair of contiguous ends of said ring sections, and a radially movable wedge-shaped cam operable from without said coupling and adapted to cooperate with said cam surfaces to spread apart said contiguous ends of said ring sections and lift said ring sections out of said groove to permit withdrawal of said male member.

2. A coupling comprising a male member and a female member adapted to form when united a smooth walled continuous passage through said coupling, a cylindrical outside surface on a portion of said male member, an annular groove in said male member, a pair of ring sections radially movable in said female member, springs tending to contract said ring sections, said ring sections being adapted to spring into said groove when said male member is inserted into said female member, cam surfaces on a pair of contiguous ends of said ring sections, a radially movable wedge-shaped cam having an extension passing through the wall of the coupling adapted to be depressed by a finger of the operator, said cam being adapted to cooperate with said cam surfaces to spread apart said contiguous ends of said ring sections and lift said ring sections out of said groove to permit withdrawal of said male member, and an annular packing ring in said female member adapted to bear upon the cylindrical outside surface of said male member, said packing ring being formed with a beveled edge permitting fluid under pressure to act upon the bevel to urge the ring into closer contact with the surface of said male member.

3. In a coupling including a male member and a female member adapted to form when united a fluid passage through said coupling, locking and unlocking means comprising an annular groove in said male member, a pair of ring sections movable in said female member, springs tending to contract said ring sections, said ring sections being adapted to spring into said groove when said male member is inserted in operative position within said female member, cam surfaces on a pair of contiguous ends of said ring sections, and a substantially radially movable cam operable from without said coupling and adapted to cooperate with said cam surfaces to spread apart said contiguous ends of said ring sections and expand said ring sections out of said groove to permit withdrawal of said male member.

F. C. LIEBHARDT.